(12) United States Patent
Langeveld et al.

(10) Patent No.: US 10,889,050 B2
(45) Date of Patent: Jan. 12, 2021

(54) METHOD OF MANUFACTURE OF A LINEAR PANEL

(71) Applicant: Hunter Douglas Industries BV, Rotterdam (NL)

(72) Inventors: Michiel Jacobus Johannes Langeveld, Rotterdam (NL); Ralph Steenbergen, Rotterdam (NL); Hans Kurt De Goeij, Rotterdam (NL)

(73) Assignee: Hunter Douglas Industries B.V., Rotterdam (NL)

( * ) Notice: Subject to any disclaimer, the term of this patent is extended or adjusted under 35 U.S.C. 154(b) by 249 days.

(21) Appl. No.: 15/661,310

(22) Filed: Jul. 27, 2017

(65) Prior Publication Data

US 2018/0009155 A1 Jan. 11, 2018

Related U.S. Application Data

(63) Continuation-in-part of application No. PCT/EP2017/067126, filed on Jul. 7, 2017.

(30) Foreign Application Priority Data

Jul. 8, 2016 (NL) ..................................... 1041974

(51) Int. Cl.
*B29C 53/02* (2006.01)
*B29C 53/84* (2006.01)
(Continued)

(52) U.S. Cl.
CPC ............ *B29C 53/02* (2013.01); *B29C 53/005* (2013.01); *B29C 53/043* (2013.01); *B29C 53/84* (2013.01);
(Continued)

(58) Field of Classification Search
CPC ....... B29C 53/02; B29C 53/043; B29C 53/84; B29C 53/005; B29K 2067/003; B29K 2067/00; B29L 2007/002
See application file for complete search history.

(56) References Cited

U.S. PATENT DOCUMENTS

| | | |
|---|---|---|
| 4,151,031 A | 4/1979 | Goad et al. |
| 5,891,379 A | 4/1999 | Bhattacharyya |

(Continued)

FOREIGN PATENT DOCUMENTS

| | | |
|---|---|---|
| CN | 103465572 A | 12/2013 |
| EP | 2599604 | 6/2013 |

(Continued)

OTHER PUBLICATIONS

Patent Cooperative Treaty International Search Report and Written Opinion, dated Dec. 13, 2017. (18 pages).

(Continued)

*Primary Examiner* — Robert J Grun
(74) *Attorney, Agent, or Firm* — Dority & Manning, P.A.

(57) ABSTRACT

In one aspect, a method of forming a linear panel from a thermoformable fibrous material by a continuous process includes continuously drawing an elongate strip of thermoformable fibrous material through a heating station to heat the material, forming the heated material into a desired panel shape, and continuously drawing the material through a cooling unit in order to cool the material after the material has been formed into the desired panel shape.

21 Claims, 10 Drawing Sheets

(51) Int. Cl.
*B29C 53/00* (2006.01)
*B29C 53/04* (2006.01)
B29L 7/00 (2006.01)
B29K 67/00 (2006.01)

(52) U.S. Cl.
CPC .... *B29K 2067/00* (2013.01); *B29K 2067/003* (2013.01); *B29L 2007/002* (2013.01)

(56) References Cited

U.S. PATENT DOCUMENTS

| | | | |
|---|---|---|---|
| 5,981,411 A | 11/1999 | Brown | |
| 2002/0137421 A1* | 9/2002 | Desroches | B27N 3/08 442/411 |
| 2010/0066121 A1 | 3/2010 | Gross | |
| 2013/0134621 A1* | 5/2013 | Tsotsis | B29B 11/16 264/177.2 |
| 2014/0030491 A1 | 1/2014 | Sakai et al. | |

FOREIGN PATENT DOCUMENTS

| | | |
|---|---|---|
| WO | WO 9624479 | 8/1996 |
| WO | WO 9704184 | 2/1997 |
| WO | WO 2005105413 | 11/2005 |
| WO | WO 2011011021 | 1/2011 |

OTHER PUBLICATIONS

Chinese Search Report issued in CN Application No. 2017800432223, dated Jul. 30, 2020 (2 pages).

* cited by examiner

Fig. 11
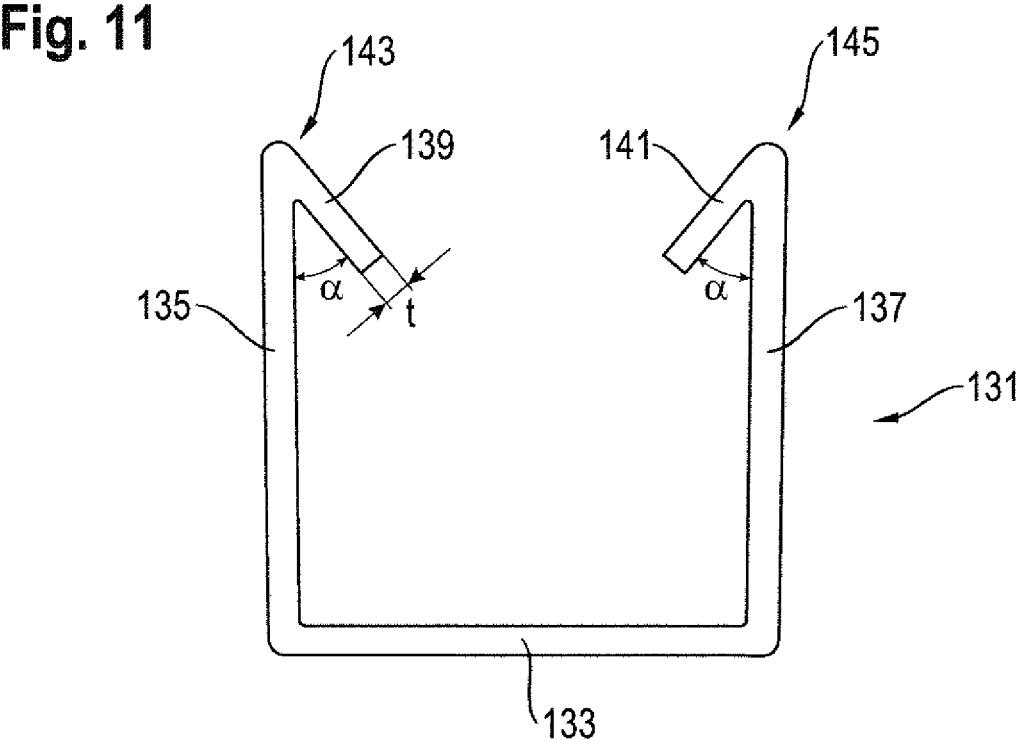
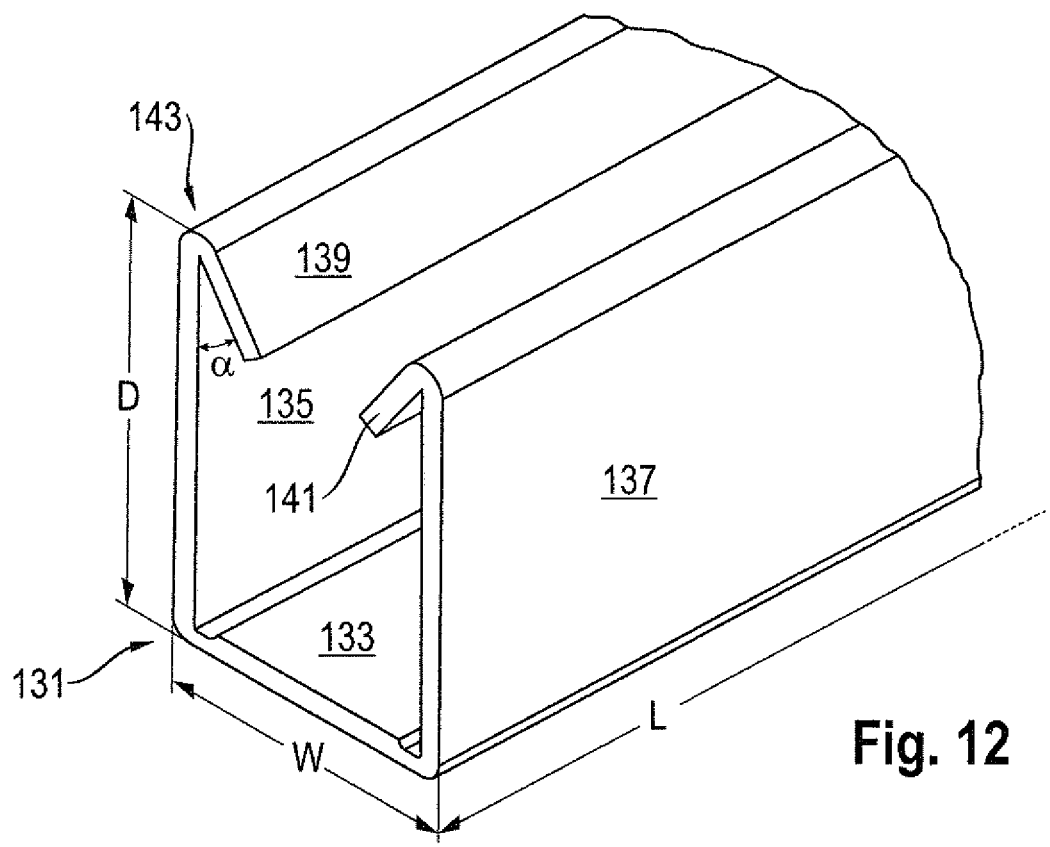
Fig. 12

METHOD OF MANUFACTURE OF A LINEAR PANEL

FIELD

The present subject matter relates to the manufacture of linear panels, and in particular linear panels formed from a thermoformable, fibrous material, and which are suitable for mounting on a ceiling or on a wall.

BACKGROUND

Linear panels formed from metals such as aluminum are known in the art. Linear panels have a length which is substantially greater than their width, the length generally being at least twice the width of the panel and typically at least five times the width of the panel.

Linear panels formed from a metal such as aluminum have the advantages of being relatively light and flame-retardant, however they do not generally exhibit favourable acoustic characteristics. It will be appreciated that in many circumstances it might be desirable to provide a ceiling or wall having good sound-absorbing properties. Such a need might be addressed by the provision of non-metallic or only partially metallic panels. Accordingly, methods for manufacturing improved non-metallic or only partially metallic panels that provide enhanced sound-absorbing properties over conventional metallic panels would be welcomed in the technology.

BRIEF DESCRIPTION

Aspects and advantages of the present subject matter will be set forth in part in the following description, or may be obvious from the description, or may be learned through practice of the present subject matter.

In general, the present subject matter provides a method of forming a linear panel from a material comprising a relatively small amount or substantially no metal, such as a fibrous material, (e.g., a thermoformable, fibrous material), and further providing linear panels made in accordance with this method as described below.

In one embodiment, the method may include continuously moving an elongate strip of thermoformable fibrous material relative to a heating source to heat the material. The method may also include forming the heated material into a desired panel shape. In addition, the method may include continuously moving the material relative to a cooling source in order to cool the material after the material has been formed into the desired panel shape.

These and other features, aspects and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 11 illustrates a cross-sectional view of one embodiment of a panel manufactured in accordance with aspects of the present subject matter;

FIG. 12 illustrates an isometric view of the panel shown in FIG. 11;

DETAILED DESCRIPTION

Figure 1:
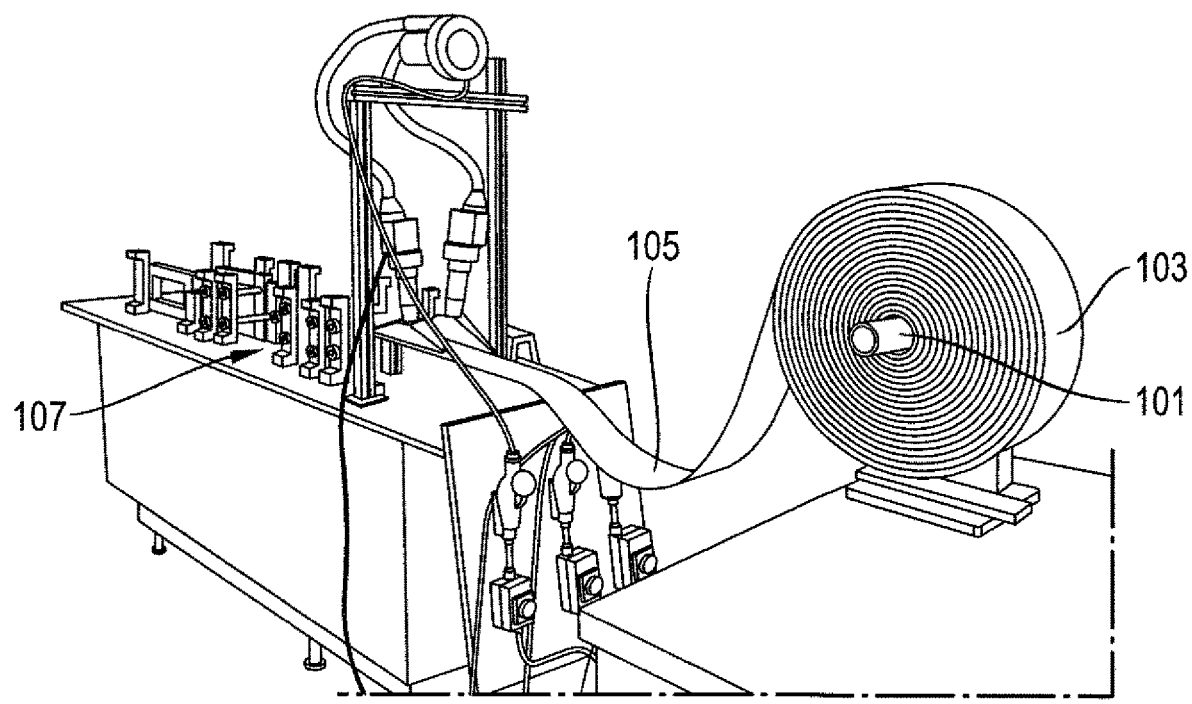
FIG. 1 illustrates a photographic view of one embodiment of a portion of manufacturing line in accordance with aspects of the present subject matter, particularly illustrating a reel around which material used to form one embodiment of the disclosed panel is coiled.

In general, the present subject matter is directed to methods for manufacturing panels from a thermoformable fibrous material. Specifically, in several embodiments, the method may include continuously moving an elongate strip of thermoformable fibrous material relative to a heating source to heat the material. Additionally, the method may include forming the heated material into a desired panel shape and continuously moving the material relative to a cooling source in order to cool the material after the material has been formed into the desired panel shape.

In one embodiment, the material may be continuously drawn through a heating station to heat the material. In such an embodiment, the heating station may include a single heating unit or device or multiple heating units or devices for heating the material. For instance, in a particular embodiment, the heating station may include a pre-heating unit, a heated mould, a thermo-forming unit, and/or any other suitable heating device. Additionally, in embodiments in which the heating station includes two or more heating devices, the heating station may formed as a continuous station with the heating devices placed back-to-back along the processing direction of the material or the heating devices may be spaced apart from one another along the processing direction of the material.

Moreover, in one embodiment, the panel material may be formed of material constituents that have differing melting temperatures. For instance, a first material constituent of the panel material may have a lower melting temperature than a second material constituent of the panel material. As a result, when the panel material is heated to the lower melting temperature, the first material constituent may be incited without melting the second material constituent. For example, in one embodiment, the panel material may be formed from bi-component polyester fibers, with each fiber including an inner core formed from a first polyester material having a first melting temperature and an outer layer or sheath formed from a second polyester material having a second, lower melting temperature, thereby allowing the outer layer or sheath of each bi-component polyester fiber to be melted without melting the inner core. Alternatively, the panel material may be formed from two or more different fibers having differing inciting temperatures.

Various processing temperatures will be described herein with reference to both heating and cooling the panel material during the performance of the disclosed panel manufacturing method. However, it should be appreciated that, in general, the specific processing temperatures used will vary depending on the particular material selected for use as the panel material, including the material properties of such material (e.g., the melting temperature of such material). Accordingly, one of ordinary skill in the art should readily appreciate that the various temperatures and temperature ranges described herein are simply provided as exemplary values based on material properties of certain thermoformable fibrous materials. In other embodiments, to accommodate panel materials having different material properties, the processing temperatures used when performing the disclosed method may vary from those described herein without deviating from the scope of the present subject matter.

According to one embodiment of the present subject matter, there is provided a method of forming a linear panel from a thermoformable fibrous material by a continuous process comprising continuously drawing an elongate strip of thermoformable fibrous material through a heating station to heat the material, forming the heated material into a desired panel shape, and continuously drawing the material through a cooling unit in order to cool the material after the material has been formed into a desired panel shape.

In one embodiment, the material is heated to a given temperature selected based on the material properties of the thermoformable fibrous material. For example, in one embodiment, the material is heated to a temperature of greater than or equal to approximately 80° C. and/or less than or equal to approximately 235° C., including any temperatures defined therebetween in increments of 5° C. Additionally, in one embodiment, the material may be heated to a temperature of greater than or equal to approximately 120° C. and/or less than or equal to approximately 160° C., including any temperatures defined therebetween in increments of 5° C.

In one embodiment, the method may include pre-heating the material. Such pre-heating may include heating air and blowing the heated air onto, across or through a surface of the elongate strip of material as the material is continuously drawn through the heated air flow. Additionally or alternatively, the pre-heating may include heating air and sucking the heated air through the elongate strip of material as the material is continuously drawn through the heated air flow.

In one embodiment, the temperature of the material may be monitored as it passes through a pre-heating stage and the temperature and/or speed of the air flow and/or the processing speed of the material through the stage may be adjusted to maintain the temperature of the material at a desired level or to adjust the temperature of the material to a desired level (e.g., by increasing or decreasing the temperature). In one embodiment, a control unit, for example a central control unit, may control the temperature and/or speed of the air flow and/or the processing speed of the material through the stage.

In one embodiment, cooling the material may include blowing air at ambient temperature or below onto, across or through the material or sucking air at ambient temperature or below through the material as the material is continuously drawn through the air flow.

In one embodiment, the temperature of the material may be monitored as it passes through the cooling unit and the temperature and/or speed of the air flow and/or the processing speed of the material through the cooling unit may be adjusted to control the temperature of the material to a desired level. In one embodiment, the temperature of the material upon exiting the cooling unit is preferably no greater than a maximum exit temperature selected for the panel material. In one embodiment, the maximum exit temperature may correspond to a temperature of less than or equal to approximately 80° C., such as less than or equal to approximately 75° C., or less than or equal to approximately 70° C. or less than or equal to approximately 65° C. and/or any other reduced temperature range in increments of 5° C. Additionally, in one embodiment, a control unit, for example a central control unit, may control the temperature and/or speed of the air flow and/or the processing speed of the material through the cooling unit.

In one embodiment, the desired panel shape may include a flange extending along at least part of an elongate side of the elongate strip of material. In one embodiment, the angle α between the flange and the elongate strip may be less than or equal to approximately 90° and/or greater than or equal to approximately 25°, including any angles defined therebetween in increments of 5°. Additionally, in one embodiment, the flange extends along the whole length of the elongate side.

In one embodiment, the elongate strip of material is drawn through the heating station at a constant speed. Additionally, in one embodiment, the speed of the material and the temperature to which the material is heated by the heating station may be controlled by a central control unit.

In one embodiment, the heating station deforms the heated material on both elongate sides of the elongate strip, thereby forming a flange on either side of the elongate strip. In one embodiment, the angle α between each flange and the elongate strip may be less than or equal to approximately 90° and/or greater than or equal to approximately 25°, including any angles defined therebetween in increments of 5°.

In one embodiment, the material is a non-woven fibrous material, such as felt, for example. In one embodiment, the material comprises synthetic fibers which may be polyester fibers (PES) or polyethylene terephthalate (PET) fibers, for example. In one embodiment, the material may comprise at least two different types of polyester fibers and/or may comprise bi-component polyester fibers.

The material may comprise a mix of single-component fibers, such as polyester fibres for example, having different melting points or temperatures. In one embodiment, the material comprises one or more types of bi-component polyester fibers. In one embodiment, the material may consist of bi-component fibers. Alternatively, the material may comprise a mixture of one or more types of bi-component polyester fibers and one or more types of non-bi-component (e.g. single-component) polyester fibers. Where the material comprises or consists of a mixture of bi-component and non-bi-component (e.g. single-component) polyester fibers, the bi-component polyester fibers may, for example, comprise at least approximately 10% of the total mass and/or volume and/or number of polyester fibers. In one embodiment, the bi-component polyester fibers may comprise at least approximately 30% of the total mass and/or volume and/or number of polyester fibers.

Additionally, in one embodiment, the bi-component polyester fibers may comprise an inner core formed from a first polyester material having a first melting temperature and an outer sheath formed from a second polyester material having a second melting temperature that is less than the first melting temperature. For instance, in a particular embodiment, the first polyester material forming the inner core may have a melting temperature of at least approximately 235° C. while second polyester material forming the outer sheath may have a melting temperature of greater than or equal to approximately 100° C. and/or less than or equal to approximately 160° C., including any temperatures defined therebetween in increments of 5° C. Moreover, in one embodiment, the non-bi-component polyester fibers may be single-component polyester fibers having a given melting temperature based on the specific material properties of such polyester fibers. For example, in one embodiment, the single-component polyester fibers may have a melting temperature of at least approximately 235° C.

In one embodiment, the polyester fibers have flame-retardant properties. Additionally, in one embodiment, the material may comprise nothing other than polyester fibres. Moreover, in one embodiment, the material does not comprise a resin.

In one embodiment, the thermoformable fibrous material may have a weight of greater than or equal to approximately 250 g/m² and/or less than or equal to approximately 1500 g/m², including any weights defined therebetween in increments of 50 g/m². Additionally, in one embodiment, the weight of the thermoformable fibrous material is greater than or equal to approximately 500 g/m² and/or less than or equal to approximately 1000 g/m², including any weights defined therebetween in increments of 50 g/m². In one embodiment, the thickness of the thermoformable fibrous material is greater than or equal to approximately 1 mm and/or less than or equal to approximately 6 mm. Moreover, in one embodiment, the thickness of the material may be at most approximately 4 mm, including any thicknesses defined therebetween in increments of 0.5 mm. Further, in one embodiment, the density of the thermoformable fibrous material may be greater than or equal to approximately 0.18 g/cm³ and/or less than or equal to approximately 0.50 g/cm³, including any densities defined therebetween in increments of 0.02 g/cm³.

In one embodiment, the thermoformable fibrous material is able to be permanently formed into a desired shape within a given temperature range selected based on the material properties of the panel material. For instance, in one embodiment, the thermoformable fibrous material is able to be permanently formed into the desired shape at a temperature of greater than or equal to approximately 80° and/or less than or equal to approximately 235° C., including any temperatures defined therebetween in increments of 5° C. Specifically, in one embodiment, the material is heated to a temperature of greater than or equal to approximately 120° and/or less than or equal to approximately 200° C., including any temperatures defined therebetween in increments of 5° C. In another embodiment, the material is heated to a temperature of greater than or equal to approximately 140° and/or less than or equal to approximately 180° C., including any temperatures defined therebetween in increments of 5° C.

In one embodiment, the temperature to which the material is heated is of interest to provide advantageous results. Specifically, when bi-component fibers, or a mix of single-component fibers having different melting points, or a mixture of bi-component fibers and single-component fibers are used, some of the fibers (or the outer sheath of the fibers in the case of bi-component fibers) have a lower melting point than other fibers (or the fiber inner core in the case of bi-component fibers). When heat is applied such that the temperature of the material exceeds the melting temperature of the fibers having a lower melting point but is lower than the melting temperature of the remaining fibers, the fibers having a lower melting temperature will melt and bond the remaining fibers (or fiber inner cores in the case of bi-component fibers) to each other. This results in a panel which retains a fibrous, felt-like appearance after heating because a large number, preferably a majority, of the fibers will not have melted during the process of heating the material. This is advantageous where the panel is desired to have good sound absorbency, and may also be aesthetically desirable. If the panel were heated to a temperature such that most or all of the fibers melted and fused together, the panel would have a smooth outer surface, and a greater density. Although this increases the strength of the material, it reduces its ability to dampen sound. Furthermore, by forming the panel at lower temperatures, energy is saved and the manufacturing costs may be reduced accordingly.

In one embodiment, the panel may be formed by a roll-forming method, by a hot-pressing method, by drawing the material through a heated mold, or by any other suitable means.

In one embodiment, the panel is formed by a continuous process such as heated roll-forming or drawing the material continuously through a heated mould.

In several embodiments, the various processing steps of the disclosed method, including, but not limited to, heating the material, forming the material, and cooling the material, may be performed in a variety of different ways and/or using any combination of suitable manufacturing equipment, devices, and/or componentry. For instance, aspects of the various example methods described herein may be combined or interchanged with other aspects to vary the manufacturing method used to form a given panel.

It should be appreciated that the disclosed method allows for panels to be manufactured from a thermoformable fibrous material that exhibit enhanced sound-absorbing properties over conventional metallic panels. In addition to such desirable sound-absorbing properties, the panels formed using the disclosed method exhibit sufficient strength and/or rigidity to allow the panels to be used in any number of different applications, including use as ceiling panels or wall panels and/or in other suitable applications for linear panels.

Methods of manufacture of a panel from a thermoformable fibrous material will now be described by way of example only:

Manufacturing a Panel Using a Roll-Forming Process

In several embodiments, the panel described herein may be formed by a roll-forming process. For instance, the panel material may be initially heated to a given pre-heat temperature to provide the material with sufficient strength to be handled during the panel manufacturing process and to prevent undue shrinkage when the material is heated to a higher temperature during the panel manufacturing process. The edges of the panel may then be bent to a desired configuration (e.g., at a bending station). Thereafter, in one embodiment, heat may be applied to the panel as it passed by rollers and, optionally, a mould, to form the remainder of the panel into the desired shape. The panel material may then be cooled to set the final shape of the finished panel.

Example 1

In this example, the panel is formed by a roll-forming process. The material may be in the form of a long strip, coiled onto a reel. In one embodiment, the material may be pre-heated to a given pre-heat temperature selected based on the specific material being used to provide the material with sufficient strength to be handled during the panel manufacturing process and to prevent undue shrinkage when the material is heated to a higher temperature during the panel manufacturing process. For example, in one embodiment, the material may be pre-heated to a temperature of less than approximately 140° C., such as less than approximately 135° C., or less than approximately 130° C.

It is desirable that shrinkage of the material during manufacture of the panel is minimized as the dimensions of the finished panel should permit the panel to be successfully mounted onto a carrier. Where the carrier has recesses configured to receive and retain the flanges of the panel, it will be appreciated that the size of the finished panel is particularly important, and including a low temperature pre-heating of the material prior to manufacturing the panel advantageously prevents or limits excessive shrinking of the material during manufacture of the panel. In order to control the effects of any further shrinking of the material during manufacture of the panel, the temperature to which the material is heated and the speed at which the material proceeds through the rollers preferably is accurately controlled during the panel manufacturing process.

FIG. 1 shows an example embodiment of a reel 101 around which the material 103 from which the panel is to be formed is coiled. The material is in the form of an elongate strip 105. Rollers (not shown), which may include small spikes, form part of the roll-forming machinery 107 and may be used to grip and pull the material through the roll-forming machinery 107. Under influence of these pulling forces, the material may stretch, thereby affecting the thickness, stiffness, and straightness of the finished panel. It is therefore advantageous to accurately control the pulling force exerted on the material during the roll-forming process, and to use material having a substantially constant thickness. For instance, in one embodiment, the material may have a thickness of greater than or equal to approximately 1 mm and/or less than or equal to approximately 6 mm, including any thicknesses defined therebetween in increments of 0.5 mm.

Once pulled from the reel 101, the elongate edges of the material strip are heated to a given temperature selected based on the material properties of the panel material. For example in one embodiment, the elongate edges of the material strip are heated to a temperature of greater than or equal to approximately 80° C. and/or less than or equal to approximately 235° C., including any temperatures defined therebetween in increments of 5° C. In a particular embodiment, the material strip is heated to a temperature of greater than or equal to approximately 120° and/or less than or equal to approximately 180° C., including any temperatures defined therebetween in increments of 5° C. In general, the specific pre-heat temperature may be selected so as to permit the finished panel to retain its shape whilst minimizing the risk of undue shrinking and enabling the material to retain its fibrous, felt-like appearance. As such, it should be appreciated that pre-heat temperature may vary depending on the properties of the panel material being used. For instance, for certain thermoformable fibrous materials described herein, a pre-heat temperature of approximately 140° C. may provide desirable results.

Figure 2:
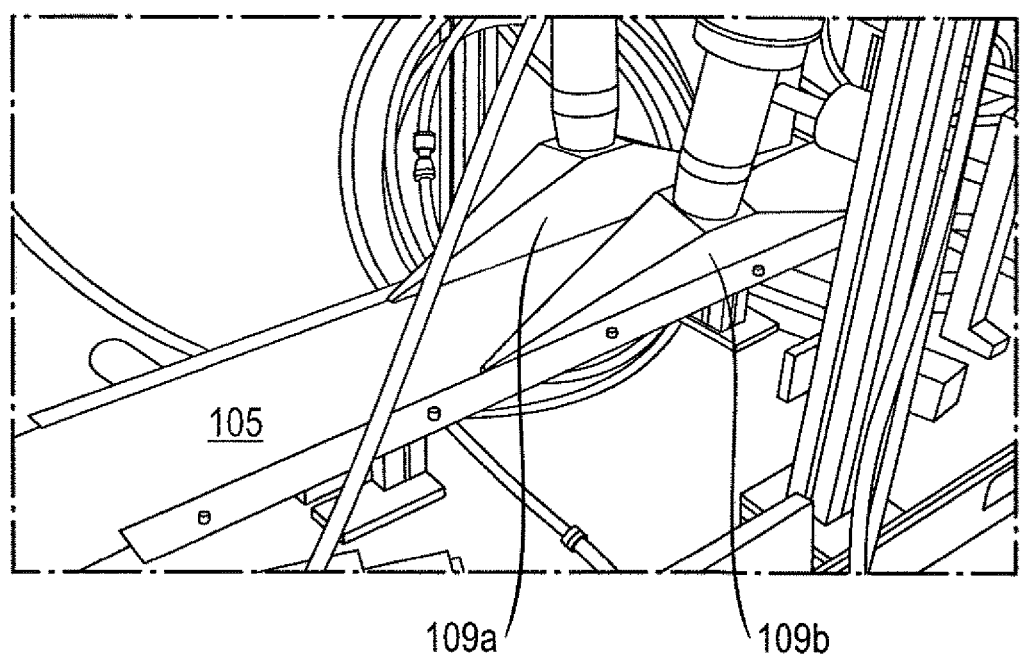
FIG. 2 illustrates a photographic view of one embodiment of a heating device that may be utilized in accordance with aspects of the present subject matter for heating panel material.

In one embodiment, a heating device 109a, 109b, such as those depicted in FIG. 2, may touch or be provided adjacent or spaced from the edges of the strip of material in order to heat the material as it continuously passes the heating device 109a, 109b. The heating device 109a, 109b may blow hot air onto the edges of the strip of material (or suck hot air through the edges of the strip of material), or may radiate heat in the form of infrared radiation thereon, for example. Alternatively, the heating device 109a, 109b may itself be heated and may conduct this heat to the passing strip of material, for example in a manner similar to an iron.

Figure 3:
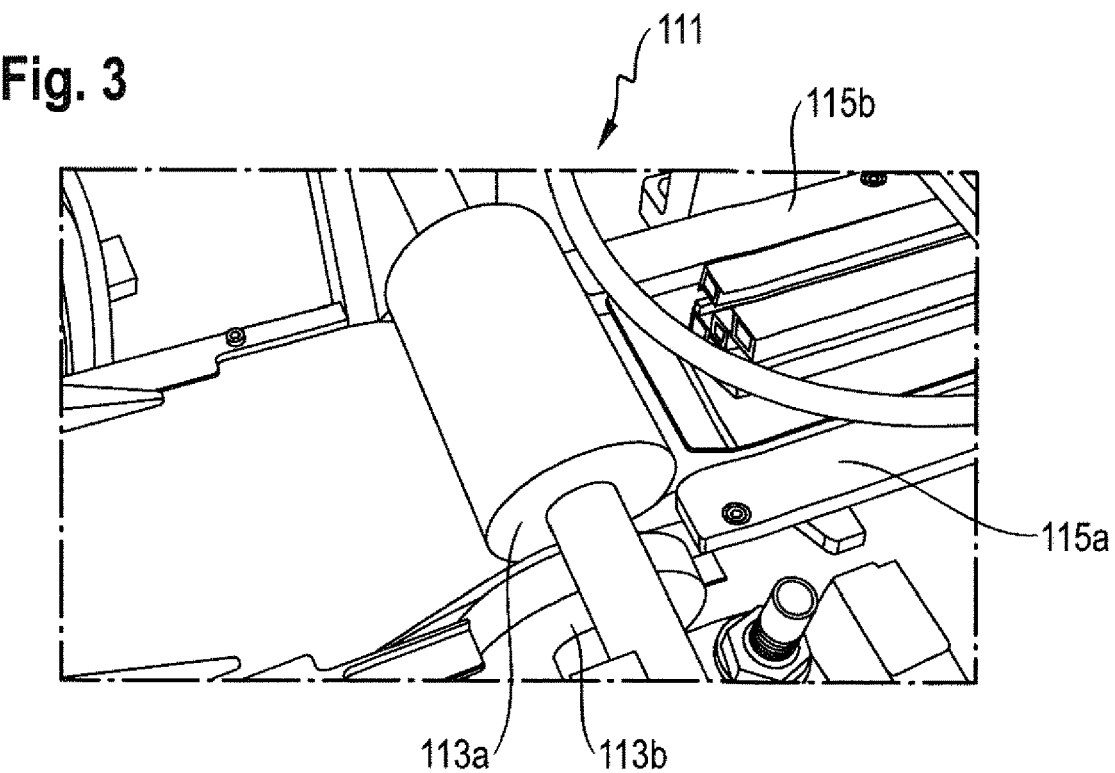
FIG. 3 illustrates a photographic view of one embodiment of a bending station that may be utilized in accordance with aspects of the present subject matter for bending the panel material.
Figure 4:
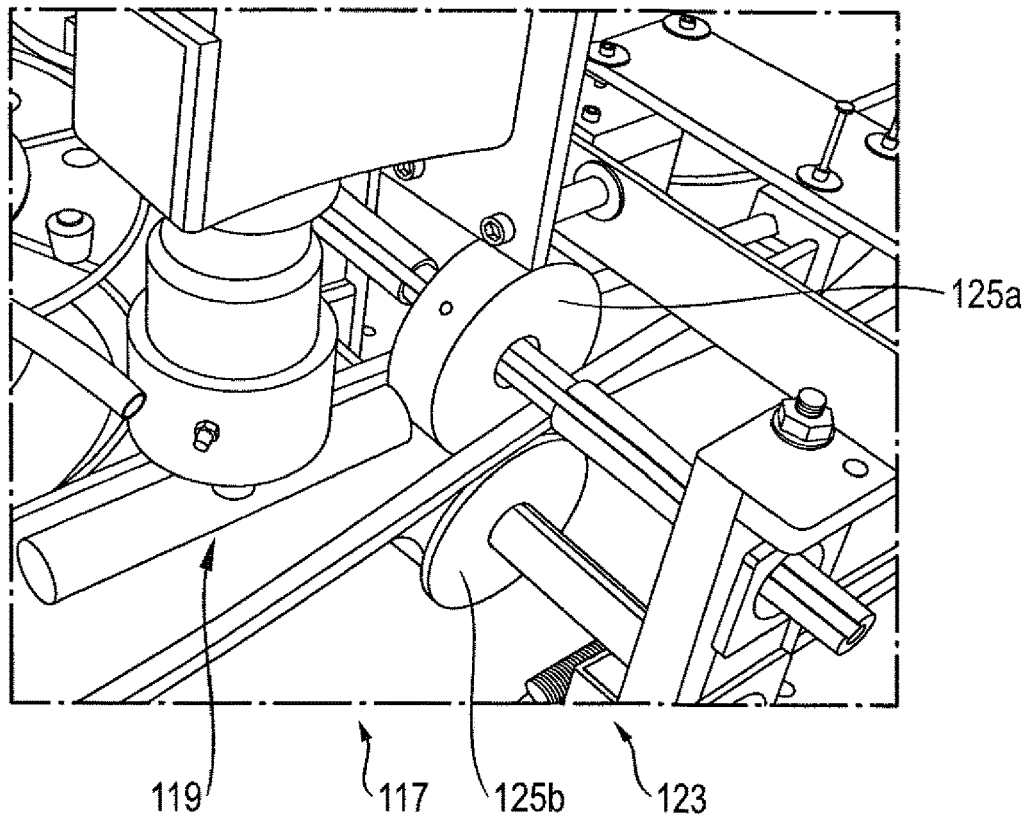
FIG. 4 illustrates a photographic view of one embodiment of a heating station that may be utilized in accordance with aspects of the present subject matter for heating panel material.

The heated edges of the strip of material then pass along to a bending station 111, an example of which is shown in FIG. 3, where the edges of the strip of material may be bent to a desired configuration. In one embodiment, rollers 113a, 113b are used to bend the edges about approximately 90° to produce a flange across each elongate side of the elongate strip, and, if desired, the strip of material may then pass bending blocks 115a, 115b configured to bend the edges still further. In one embodiment, the bending blocks may be configured to further bend the edges from the angle of approximately 90° an amount greater than or equal to 20° and/or less than or equal to 70°, including any other angles defined therebetween in increments of 5°. In another embodiment, the bending blocks may be configured to further bend the edges from the angle of approximately 90° an amount greater than or equal to 35° and/or less than or equal to 55°, including any other angles defined therebetween in increments of 5°. In the particular example illustrated herein, the bending blocks are configured to bend the edges a further 45° approximately.

Where the panel is to be provided in the form of a baffle, and it is designed to hang from a carrier from one elongate side, no further bending of the panel may be necessary. However, where the panel is intended to have a substantially "U"-shaped cross-section, and to hang from the carrier from both elongate sides of the panel, further bending of the panel may be desirable. To achieve this, a further heating station 117, such as that shown in FIG. 4, is provided. At heating station 117, heat is provided to a roller 119 which passes over the elongate central portion 121 of the elongate strip of material. The material then passes through a further bending station 123 which comprises two rollers 125a, 125b which cause the elongate edges of the elongate central portion to bend through approximately 90°. This provides the panel with a substantially "U"-shaped cross-section, as can be seen in the example embodiment of FIGS. 5 and 6.

Optionally, roller 119 may have edges 127a, 127b which are thicker (i.e., have a greater radius r) than the central roller surface 129. This will cause that portion of the material directly contacted by the thicker edges 127a, 127b of the roller to be compressed more than the adjacent portions of material, which results in additional stiffness to the finished panel and also enables the material to be bent more easily at bending station 123, as well as enabling sharper bends to be firmed at bending station 123.

Figure 5:
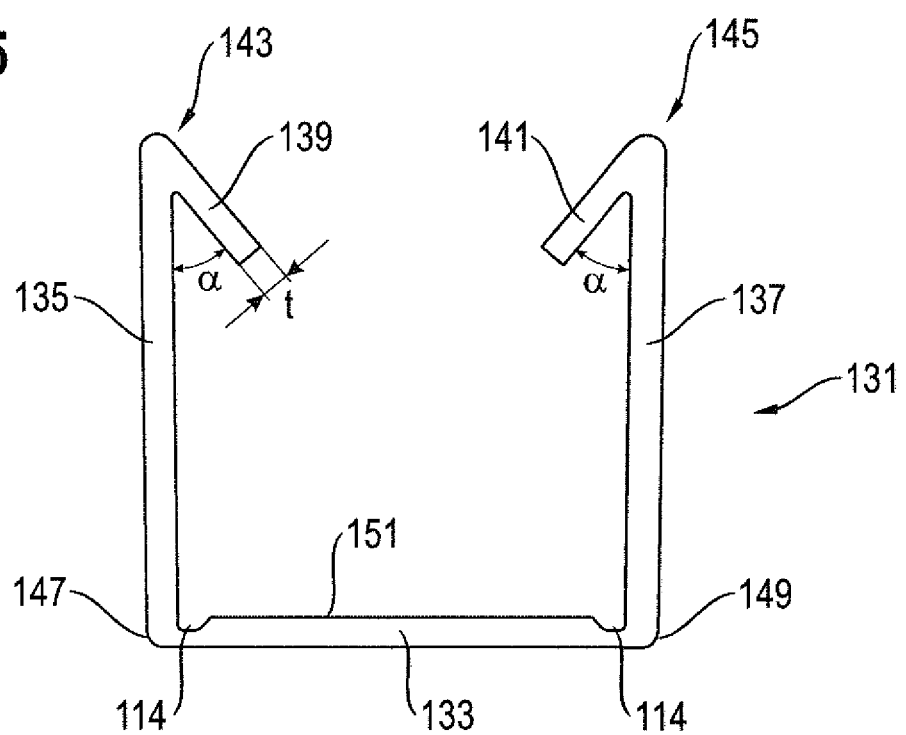
FIG. 5 illustrates a cross-sectional view of one embodiment of a panel manufactured in accordance with aspects of the present subject matter.
Figure 6:
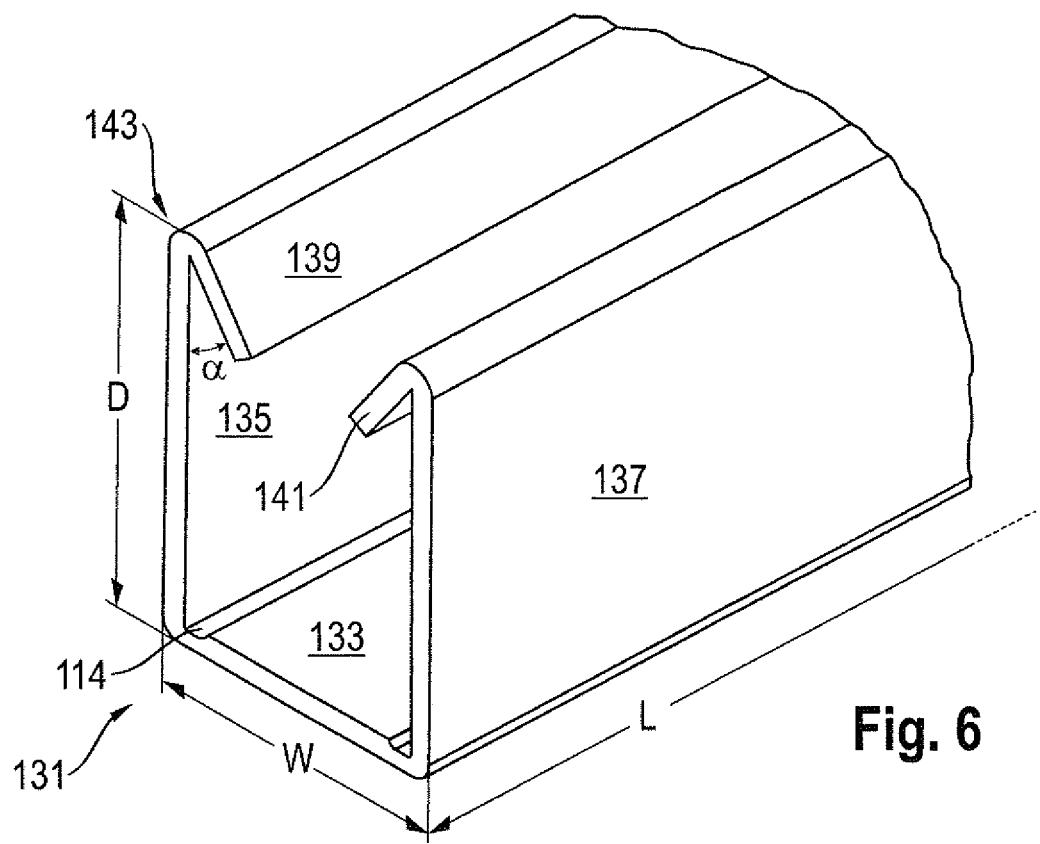
FIG. 6 illustrates an isometric view of the panel shown in FIG. 5.

As indicated above, FIGS. 5 and 6 show an example of a panel made in accordance with aspects of the present disclosure, in cross-sectional view and isometric view, respectively. The panel 131 has a substantially "U"-shaped cross-section, and comprises a central portion 133 and side walls 135, 137, each of the side walls 135, 137 being bent at portions 143, 145 to form flanges 139, 141, respectively. As can be seen more clearly in the isometric view depicted in FIG. 6, the panel has a length L, the length L being substantially greater than the width W or depth D of the panel. The flanges 139, 141 of the panel are configured to be received into and retained by complementary-shaped recesses in a panel carrier (not shown) to enable mounting of the panels on, for example, a ceiling or a wall. In one embodiment, the bends as portions 143, 145 are created at bending station 111 as described with respect to FIG. 3. Additionally, in one embodiment, the substantially right-angled bends 147, 149 between the central portion 133 and the side walls 135, 137 are formed at further bending station 123 as described with respect to FIG. 4. Where roller 119 of the further bending station 123 has thicker edges 127a, 127b, the inner surface 151 of the panel will be compressed more at the location of the bends 147, 149 than at portions adjacent to the bends 147, 149, resulting in a thinner portion 114 at bends 147, 149. This permits the material to be bent more easily at the further bending station 123.

In the example described above, the material strip 105 is heated on one side only—i.e., the side which faces upwards (the visible side) in FIGS. 1 to 4. This is the side which forms the inner surface 151 of the panel. However, the material strip could additionally or alternatively be heated on the other side if desired.

In one embodiment, it is desirable to heat the material strip 105 on one side only, that side forming the inner surface 151 of the panel, because, during heating, some of the fibers will melt, thereby bonding the remaining fibers together upon cooling. This melting typically results in a surface which is harder, and/or rougher, and which has a less fibrous, felt-like appearance than the parts of the material which have not been subjected to heating. By applying heat to only the side of the strip which forms the inner surface of the panel, the less-desirable appearance which may result from heating may be restricted to the inner, non-visible surface, and the outer surface of the panel, which has not been subject to the same level of heating, may retain its initial, e.g., fibrous, felt-like, appearance. This is also advantageous with regard to the acoustic properties of the finished panel, as the more fibrous nature of the outer surface of the panel is better adapted to absorb sound than the hardened more dense inner surface.

Figure 7:
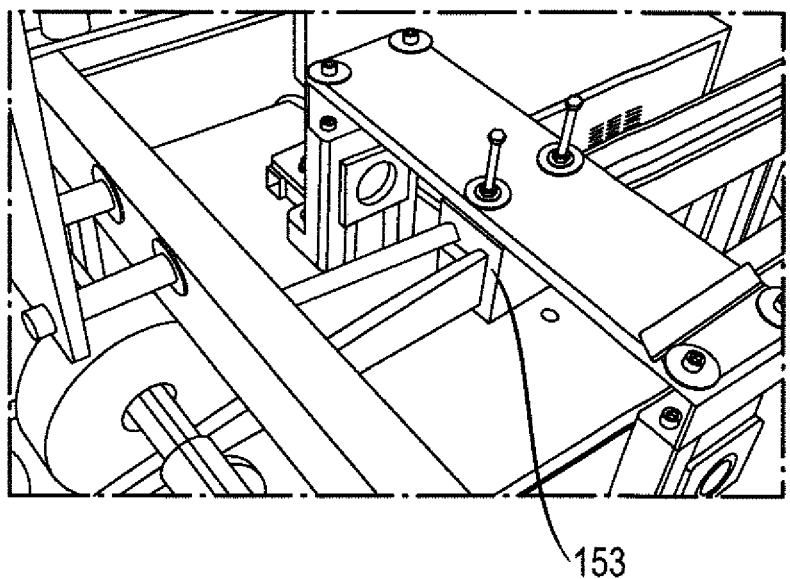
FIG. 7 illustrates a photographic view of one embodiment of a mould that may be utilized in accordance with aspects of the present subject matter when forming one embodiment of the disclosed panel.
Figure 8:
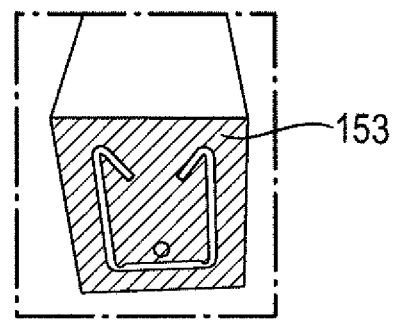
FIG. 8 illustrates a photographic end view of the mould shown in FIG. 7.

Following the formation of an elongate panel as described above, the elongate panel may optionally be passed through a mould as depicted in FIG. 7. FIG. 8 shows an end view of the mould 153. By passing the elongate panel through mould 153, the shape of the panel 131 can be more accurately controlled. The mould 153 does not need to be heated, but low temperature heating of the mould may be advantageous to enable even greater control of the shrinkage of the panel material and therefore the shape of the finished panel.

Figure 9:
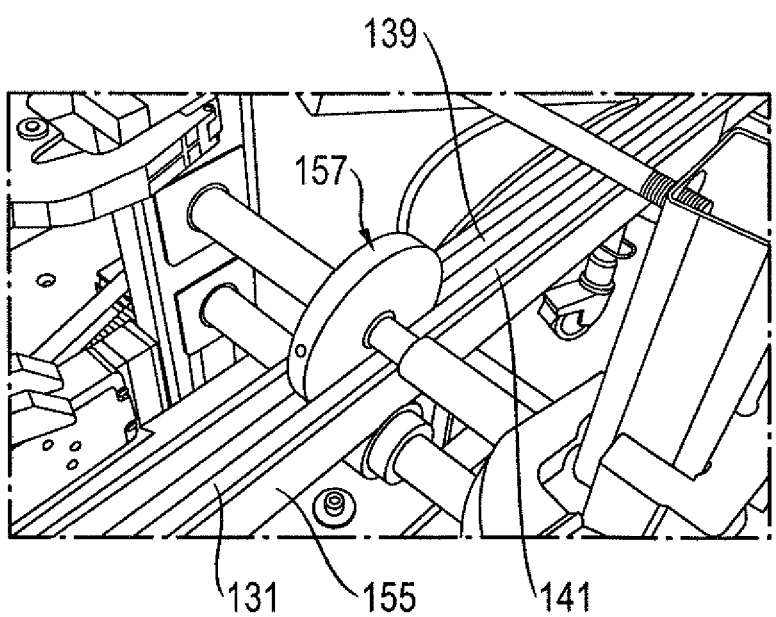
FIG. 9 illustrates a photographic view of one embodiment of a cooling stage that may be utilized in accordance with aspects of the present subject matter for cooling panel material.

Following formation of the panel, the panel material according to this example is cooled. In one embodiment, the panel material passes through a cooling stage where it may be cooled, for example, by chilled air or by air at ambient temperature. Active cooling, such as directing ambient or chilled air onto or through the panel material or passing the material through a cooled mould, may be employed. FIG. 9 shows one example of cooling of the material. In FIG. 9 the material is cooled via ambient air. During this cooling process, the elongate panel 131 is supported in a "U"-shaped channel 155. A roller 157 may be optionally provided to press and maintain flanges 139, 141 in position and prevent them from springing hack to their original pre-formed position when the material is cooled. The panel typically needs to be sufficiently cooled in order to fix the fibers into position and thereby set the final shape of the finished panel. In one embodiment, this is achieved, for example, when the material reaches a temperature of approximately 80° C. or below. However, in other embodiments, the temperature to which the panel needs to be cooled to set the final shape of the finished panel may correspond to any other suitable cooling temperature depending on, for example, the material properties of the selected panel material.

The cooling process (as indeed the heating process) may be dependent upon the speed at which the material is fed through the cooling (or heating) stages. For example, in one embodiment, at speeds of approximately 2 metres/minute, passing the material through ambient air generally should be sufficient to permit satisfactory cooling of the material. However, at faster speeds of 10 to 20 metres/minute, cooled air may need to be blown directly onto or sucked through the material in order to achieve satisfactory cooling of the material. Alternatively, the material could instead be passed through a chilled mould. It should be appreciated that, in addition to the speed at which the material is fed through the cooling (or heating stages), the actual length of such stage(s) may also impact the cooling (or heating) process. For instance, for a longer cooling stage, ambient air may be used for cooling at faster processing speeds than for a significantly shorter cooling stage.

Finally, once cooled, the elongate panel may be cut into desired lengths. Depending on the desired use of the panels, the lengths will generally vary. However, in one embodiment, the panel length will generally be on the order of greater than or equal to 0.5 meters and/or less than or equal to 6 meters, including any lengths defined therebetween in increments of 0.25 meter.

In order to provide each flange of each panel with the same predetermined length, the flanges may be manufactured to be slightly oversized so that they can then be cut during an optional final stage to the precise length required to fit within, for example, the recess of a panel carrier.

Additionally, it should be appreciated that, if extra bends are required to form the final panel shape, extra heating and bending stations may be provided as necessary. Furthermore, one or more of the roll-form bending stations may be replaced by an elongated mould or form block, which may be heated. Further details of a panel manufacturing process utilizing a mould instead of roll-forming is described below and in Example 2.

Panel Manufacturing Process Utilizing a Mould

Where the heating station comprises a heated mould, the elongate strip of material may be continuously drawn through the heated mould, the mould heating the material to and/or maintaining the material at a given temperature selected, for example, based on the material properties of the panel material. For instance, in one embodiment, the strip of material may be heated to a temperature of greater than or equal to approximately 80° C. and/or less than or equal to approximately 235° C., including any temperatures defined therebetween in increments of 5° C. In a particular embodiment, the strip of material may be heated to a temperature of greater than or equal to approximately 120° C. and/or less than or equal to approximately 160° C., including any temperatures defined therebetween in increments of 5° C. As the elongate strip is drawn through the heated mould, the mould deforms the heated material into a desired panel shape. In one embodiment, the elongate strip of material is drawn through the heated mould at a constant speed, with the speed of the material and the temperature of the mould optionally being controlled by a central control unit.

In one embodiment, the heated mould may deform the heated material on both elongate sides of the elongate strip, thereby forming a flange on either side of the elongate strip. In one embodiment, the angle α between each flange and the elongate strip is less than or equal to approximately 90° and/or greater than or equal to approximately 25°, including any angles defined therebetween in increments of 5°.

In one embodiment, the method further comprises pre-heating the elongate strip of material to a given pre-heat temperature selected, for example, based on the material properties of the panel material. For example, in one embodiment, the strip of material may be pre-heated to a temperature of greater than or equal to approximately 80° C. and/or less than or equal to approximately 160° C., including any temperatures defined therebetween in increments of 5° C. The pre-heating may take place before the material enters the heated mould and may include heating air and blowing the heated air onto a surface of the elongate strip of material as the material is continuously drawn through the heated air flow. Alternatively, the air may be heated and then sucked through the elongate strip of material as the material is continuously drawn through the pre-heating apparatus.

Additionally or alternatively, pre-heating may comprise drawing the elongate strip of material through a pre-heating mould. In one embodiment, the pre-heating mould preferably acts to heat the material only, and does not act to deform the material. The pre-heating mould may be part of the heated mould or may be a separate apparatus, such as an infrared heating device or an air heated oven, for example.

Moreover, in one embodiment, the method further comprises cooling the material after the material exits the heated mould. Cooling the material may comprise blowing air at ambient temperature or below onto or through the material as the material is continuously drawn through the air flow. Alternatively, the air may be sucked through the material as the material is continuously drawn through the cooling apparatus. In one embodiment, the process of cooling the material includes cooling the air before blowing the air onto or sucking the air through the material. However, in other embodiments, cooling air at room or ambient temperature may be used.

Additionally or alternatively, the cooling process may comprise drawing the material through a cooling mould. In one embodiment, the cooling mould acts to cool the material whilst maintaining its formed shape. The cooling mould may be part of the heated mould or may be a separate apparatus.

Additionally, in one embodiment, the method may further comprise cutting the elongate strip of material into desired linear panel lengths after the material has been cooled. Cutting may be carried out by a guillotine, a rotary blade, a heated wire, or by ultrasonic cutting apparatus, for example.

Moreover, in several embodiments, the material may be drawn through the heated mould by rollers. These rollers advantageously act to pull the material through the heated mould, and may include features such as spikes to facilitate such pulling. As an alternative, rollers with a sticky surface, or rollers made of or having a surface made of or covered by a high friction material, such as rubber or sand paper, may be used instead.

In one embodiment, the heated mould may comprise a plurality of form blocks each having a different cut-out shape such that, when the material passes through the heated mould, the material passes through each of the form blocks in turn, thereby gradually changing the shape of the material from a flat, elongate strip to a linear panel having a desired panel shape. For instance, the form blocks may form all or part of a progressive heated mould used to progressively or gradually form the panel into the desired panel shape An example of a method of forming a linear panel using a heated mould is given in Example 2 below.

Example 2

Figure 10:
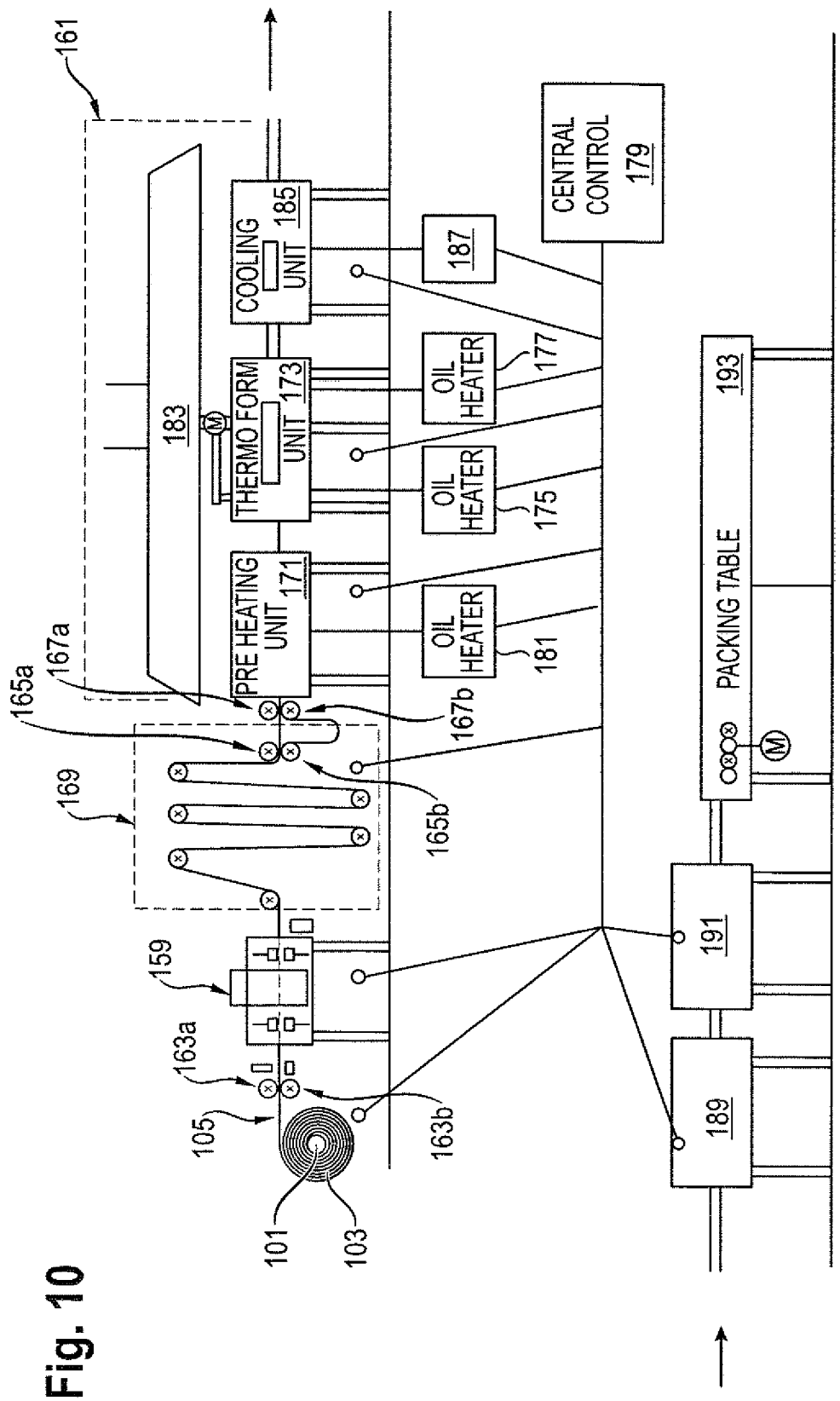
FIG. 10 illustrates a schematic view of one embodiment of a continuous process and apparatus for forming a panel in accordance with aspects of the present subject matter.

FIG. 10 shows a schematic view of an example of a continuous process and apparatus for forming a panel using a heated mould. In this example, the material 103 is of the form of an elongate strip 105 coiled onto a reel 101. In one embodiment, a coil-coupling apparatus 159 is provided to couple the material at the end of one coil to the material at the beginning of another coil as desired or needed, thereby enabling the material to be continuously fed through the heated mould. The coil-coupling apparatus 159 may staple, stick, tape, or sew the coils together, or may couple the coils together in any other known manner. For instance, in a particular embodiment, the coil coupling apparatus may comprise an ultrasonic welding apparatus, such as an ultrasonic knife, for simultaneous splicing and cutting the material.

In the illustrated embodiment, the material is pulled from the reel towards and through the heated mould by pulling device 189, which may include one or more rollers having spikes or a high friction material, such as rubber or sand paper, on the roller surface for gripping and pulling the material. In one embodiment, in order to minimize stretching of the material, the pulling force exerted on the material by the pulling device 189 is carefully controlled and the temperature of the material at the pulling device 189 is maintained at or below a given temperature to minimize stretching of the material. For example, in one embodiment, the temperature of the material at the pulling device 189 is preferably lower than 100° C., such as lower than 90° C. or lower than 80° C. and/or any other temperature reductions from 100° C. in increments of 5° C. Additionally, in one embodiment, the material has a substantially constant thickness, which may, for example, be greater than or equal to approximately 1 mm and/or less than or equal to approximately 6 mm, including any thicknesses defined therebetween in increments of 0.5 mm.

Optionally, a buffer (accumulator) 169 may be provided to readily enable the material to be passed through the heated mould at a constant speed, regardless of whether the coils are in the process of being joined together or not. As indicated above, it may be desirable that the material be passed through the heated mould at a constant speed and that the temperature of the heated mould be accurately controlled as these two factors control the melting of the fibers of the material and hence the strength, shape, acoustic characteristics, and other properties of the finished panel.

The rollers 163*a*, 163*b*, 165*a*, 165*b*, 167*a*, 167*b* pull the material through the buffer 169. These rollers may have spikes or a high friction material, such as rubber or sand paper, on the roller surface for gripping and pulling the material.

In this example, there is a moulding unit 161 which comprises a pre-heating unit 171. Alternatively, a pre-heating unit may be provided independently of and upstream of the moulding unit. Pre-heating the material to a given pre-heat temperature selected, for example, based on the material properties of the panel material helps to strengthen the material and encourages any pre-shrinking of the material prior to entry into the thermoforming unit 173 of the molding unit. For example, in one embodiment, the panel material may be pre-heated to a temperature of greater than or equal to approximately 80° C. and/or less than or equal to approximately 120° C., including any temperatures defined therebetween in increments of 5° C. As indicated above, it may be desirable that any shrinkage of the material during forming of the linear panel is minimized as the dimensions of the finished panel should permit the panel to be successfully mounted onto a carrier.

Furthermore, by providing the pre-heating unit, the material entering the thermoforming unit 173 can, for example, be at the required forming temperature so that there is no need for the material to be heated in the thermoforming unit prior to forming the panel, thereby enabling the material to pass through the thermoforming unit at an increased speed, with the result that the production rate of the panels is increased. If no pre-heating is provided, the material generally will need to be heated by the heated mould to reach the required forming temperature before the material can be formed into a linear panel. In other embodiments, a combination of pre-heating and heating within the thermoforming unit can be utilized to heat the material during the forming process.

In this example, the pre-heating unit comprises a heated mould or heated plates which conduct heat to the elongate strip as it passes therethrough. In other examples, the pre-heating unit may instead blow hot air onto or through the elongate strip of material, or may suck hot air through the elongate strip of material, or may radiate heat in the form of infrared radiation thereon, for example.

In one embodiment, the thermoforming unit 173 comprises a heated mould for thermoforming the panel into a desired shape, the shape being dictated by the heated mould.

In one embodiment, the thermoforming unit 173 may be heated by hot oil which passes through channels in the mould to heat up the mould. The oil may be heated by oil heaters 175, 177. The heaters 175, 177, and therefore the temperature of the oil, are controlled by a central control unit 179. Heater 175 may be controlled to heat the oil to a different temperature than heater 177, so that the material passing through the thermoforming unit 173 experiences a step-wise, or, alternatively, a gradual increase in temperature as it passes through the thermoforming unit 173. Such an arrangement may be particularly advantageous where there is no pre-heating unit provided.

A separate oil heater 181 may also be provided for the pre-heating unit 171, the oil heater 181 also being controlled by the central control unit 179. The thermoforming unit 173 may be heated by other means, however providing hot oil in channels formed in the unit 173 is advantageous as the oil will tend to retain heat longer than many other common liquids such as water, and can be used to accurately control the temperature of the heated mould and therefore the temperature of the material passing therethrough.

In one embodiment, the heated mould heats and/or maintains the temperature of the material at a given temperature selected, for example, based on the material properties of the panel material. For instance, in one embodiment, the heated mould heats and/or maintains the temperature of the material of a temperature greater than or equal to approximately 140° C. and/or less than or equal to approximately 180° C., including any temperatures defined therebetween in increments of 5° C. In one embodiment, the exact temperature will be dependent upon the temperature at which the lower melting point fibres (or outer sheath of the bi-component fibres) become soft and deformable. Overheating is not desirable—the forming temperature of the heated mould should be set such that the material is able to be deformed into the panel shape whilst passing through the heated mould whilst enabling the material to retain its fibrous, felt-like appearance. This is not only for aesthetic considerations—the fibrous nature of the outer surface of the panel allows sound to be absorbed by the panel, thereby enhancing the acoustic properties of the panel and attenuating unwanted noise in rooms in which the panel is installed.

In one embodiment, the moulding unit 161 may also comprise a cooling unit 185 downstream of the thermoforming unit 173. The cooling unit 185 may form an integral part of the moulding unit 161 or may be provided separately and downstream of the moulding unit 161. The cooling unit may comprise a mould, form block, or channel through which the material passes. In one embodiment, fluid is supplied to the cooling unit 185 from fluid reservoir 187. The cooling unit may be in the form of a cooling mould through which the formed material passes. In this case, the fluid reservoir may supply a cooled liquid, such as cooled oil, to channels formed in the cooling unit 185. The cooling unit 185 is preferably configured to support and maintain the shape of the panel and to cool the material such that material exiting the cooling unit is no more, for example, than a given temperature, such as a temperature of approximately 80° C. This permits the fibers to be fixed into position and sets and stabilizes the final shape of the panel.

In an alternative example, the fluid reservoir supplies air to the cooling unit 185. The air may be at ambient temperature or may be cooled, and may be blown across, through or onto the surface of the material passing through the cooling unit 185, or may be sucked through the material as it passes through the cooling unit. FIG. 9 shows one such example of cooling of the material. In FIG. 9, the material is cooled via ambient air. During this cooling process, the elongate panel 131 is supported in a "U"-shaped channel 155. A roller 157 may be optionally provided to press and maintain flanges 139, 141 in position and prevent them from springing back to their original position when the material is cooled. The panel needs to be sufficiently cooled in order to fix the fibers into position and thereby set the final shape of the finished panel. This should be achieved, for example, when the material reaches or drops below a given temperature. For example, in one embodiment, the final shape of the finished panel may be set at a temperature of approximately 80° C. or below.

As indicated above, the cooling process (as indeed the heating process) may be dependent upon the speed at which the material is fed through the cooling (or heating) stages. For example, in one embodiment, at speeds of approximately 2 metres/minute, passing the material through ambient air generally should be sufficient to permit satisfactory cooling of the material. However, at faster speeds of 10 to 20 metres/minute, cooled air may need to be blown directly onto or sucked through the material in order to achieve satisfactory cooling of the material given the faster processing speed. Additionally or alternatively, the material could be passed through a chilled mould as described above. It should be appreciated that, in addition to the speed at which the material is fed through the cooling (or heating stages), the actual length of such stage(s) may also impact the cooling (or heating) process. For instance, for a longer cooling stage, ambient air may be used for cooling at faster processing speeds than for a significantly shorter cooling stage.

Once the panel has cooled, it is able to be pulled without causing unwanted stretching of the material, and pulling unit 189 may be provided for this purpose. Finally, the cooled elongate panel may be cut into two or more elements of desired lengths by cutting unit 191.

In one embodiment, the pre-heating and cooling units may heat/cool the material strip on one side only. Alternatively, the pre-heating and cooling units may heat/cool the material strip on both sides as it passes through the pre-heating/cooling unit.

In one embodiment, in order to provide each flange of each panel with the same predetermined length, the flanges may be manufactured to be slightly oversized so that they can then be cut during an optional final stage to the precise length required to fit within, for example, the recess of a panel carrier. In one embodiment, a packing table 193 may be provided at the downstream end of the production apparatus.

Additionally, in one embodiment, an extractor unit 183 may also be provided in the vicinity of the heated mould and/or any pre-heating or cooling units to remove surplus heat from the surrounding area.

In one embodiment, the material may be passed through the panel-forming apparatus at speeds of greater than or equal to approximately 10 metres/minute and/or less than or equal to 20 metres/minute, including any speeds defined therebetween in increments of 1 metre/minute. Additionally, in one embodiment, the speed of transit and the temperature of the pre-heating unit 171, thermoforming unit 173, and the cooling unit 185 may be controlled by central control unit 179. For example, in one embodiment, the material may travel at a speed of 15 metres/minute, the pre-heating unit 171 and thermoforming unit 173 may both be approximately 1.5 meters long, and the material will therefore take approximately 6 seconds to pass through the pre-heating unit 171 and a further 6 seconds to pass through the thermoforming unit 173. In one embodiment, the pre-heating unit 171 may heat the material to approximately 130° C. whilst the thermoforming unit heats the material gradually from approximately 130° C. to approximately 145° C. Alternatively, the pre-heating unit 171 may heat the material to approximately 150° C., for example, whilst the thermoforming unit maintains this temperature during forming of the panel. In other embodiments, the processing temperature(s) of the pre-heating unit 171 and/or the thermoforming unit may correspond to any other suitable temperature(s) selected, for example, based on the material properties of the panel material.

In one embodiment, the central control unit 179 may be configured to implement closed-loop control of one or more of the process components, such as the motor associated with reel 101, the coil coupling apparatus 159, the accumulator 169, any suitable component(s) of the moulding unit 161, one or more of the heaters 175, 177, 181, the pulling unit 189, the cutting unit 191, and/or any other suitable components or equipment utilized in forming a panel as described herein. As such, the central control unit 179 may be communicatively coupled to any number of sensors or other inputs devices configured to provide operational feedback to the central control unit 179, such as temperature sensors, speed sensors, and/or the like. For instance, temperature sensors provided in operative association with the pre-heating unit 171, the thermo-forming unit 173, and/or the cooling unit 185 may be configured to provide temperature feedback to the central control unit 179, which may then allow the central control unit 179 to adjust the processing temperature and/or processing speed, as necessary or desired.

It should be appreciated that, in one embodiment, the central control unit 179 may correspond to any suitable processor-based device(s), such as a computing device or any combination of computing devices. Thus, the central control unit 179 may generally include one or more processor(s) and associated memory devices configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store information accessible to the processor(s), including data that can be retrieved, manipulated, created and/or stored by the processor(s) and instructions that can be executed by the processor(s). For instance, computer-readable instructions may be stored within the memory that, when implemented the processor(s), configure the central control unit 179 to perform one or more of the control functions described herein.

FIGS. 11 and 12 show one example of a panel made in accordance with aspects of the present disclosure, in cross-sectional view and isometric view, respectively. As can be seen in FIG. 11, the panel 131 has a substantially "U"-shaped cross-section, and comprises a central portion 133 and side walls 135, 137, with each of the side walls 135, 137 being bent at portions 143, 145 to form flanges 139, 141, respectively. As can be seen more clearly in the isometric view depicted in FIG. 12, the panel has a length L, the length L being substantially greater than the width W or depth D of the panel. In one embodiment, the flanges 139, 141 of the panel are configured to be received into and retained by complementary-shaped recesses in a panel carrier (not shown) to enable mounting of the panels on, for example, a ceiling or a wall.

Example 3

Figure 13:
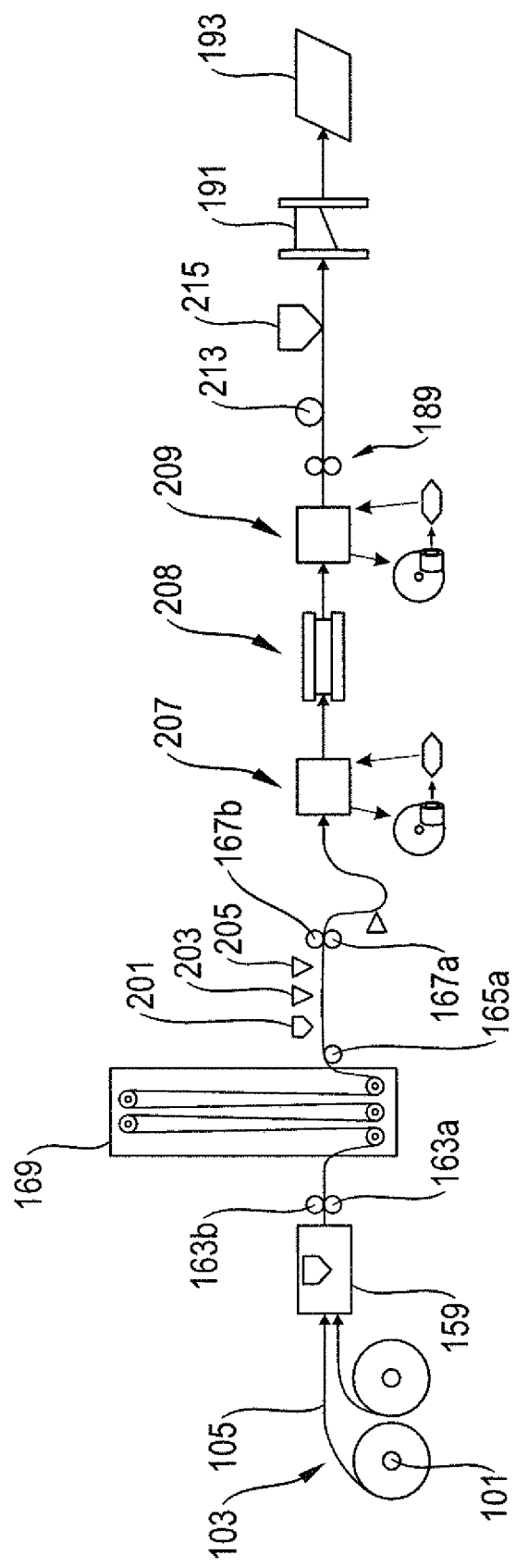
FIG. 13 illustrates a schematic view of another embodiment of a continuous process and apparatus for forming a panel in accordance with aspects of the present subject matter.

FIG. 13 shows a further example of a process and apparatus for producing a linear panel in accordance with aspects of the present disclosure. The panel may be similar to that depicted in FIGS. 11 and 12, for example. This example is similar to Example 2 as described above, and only notable differences between the two examples will be described in detail.

In this example, as for the previous one, the material 103 is of the form of an elongate strip 105 coiled onto a reel 101. In one embodiment, a coil-coupling apparatus 159 is provided to couple the material at the end of one coil to the material at the beginning of another coil as desired or needed, thereby enabling the material to be continuously fed through the heated mould. In this example, the coil-coupling apparatus comprises an ultrasonic welding apparatus which includes an ultrasonic knife for simultaneous heating and cutting of the material.

The material is pulled from the reel towards and through the heated mould by pulling device 189, which may include rollers having features or elements which grip and pull the material, such as spikes or a high friction material, such as rubber or sand paper, on the roller surface. In one embodiment, in order to minimize stretching of the material, the pulling force exerted on the material by the pulling device 189 is carefully controlled. Additionally, in one embodiment, the material has a substantially constant thickness, which may be, for example, greater than or equal to approximately 1 mm and/or less than or equal to 6 mm, including any thicknesses defined therebetween in increments of 0.5 mm, to enable the material to be readily passed through the heated mould and produce linear panels to a desired tolerance.

Optionally, a buffer (accumulator) 169 may be provided to readily enable the material to be passed through the heated mould at a constant speed, regardless of whether the coils are in the process of being joined together or not. The material is pulled through the buffer 169 by the pulling rollers 163a, 163b, 165a, 165b, 167a, 167b which may incorporate small spikes or a high friction material, such as rubber or sand paper, on the roller surface or other features or elements to grip and pull the material.

In this example, there is a metal detection unit 201 for detecting, for example, needles or broken needle tips which are present in the material. This is an optional unit. Where the metal detection unit is provided, there may also be provided a needle marking unit 203 for marking for identification purposes the location of a metal piece in the material. The marking unit may comprise a pen or may comprise a stamping device or an inking device, for example. Such a metal detection unit and marking unit could also be provided in the apparatus and method taught in Examples 1 and 2 if desired.

Optionally, a branding unit 205 may also be provided to add logos or other designs, patterns, and/or indicia to the material as it passes through the panel production apparatus. Again, such a branding unit could also be provided in the apparatus and method taught in Examples 1 and 2 if desired.

In this example, there is a pre-heating unit 207 which includes an air heater and an air blower. The air is heated by the air heater and then blown onto the surface of the elongate strip of material as it passes through the pre-heating unit. In one embodiment, the heated air is able to rapidly heat the material as it passes through to a given temperature, such as to a temperature of greater than or equal to approximately 140° C. and/or less than or equal to approximately 180° C., including any temperatures defined therebetween in increments of 5° C. In one embodiment, the air may exit the air heater at a higher temperature than the temperature to which the material is being heated, such as an air temperature of approximately 200° C. In other examples, the air heated by the air heater may be sucked through the elongate strip of material as it passes through the pre-heating unit. Additionally, in one embodiment, the temperature of the material may be monitored as it passes through the pre-heating unit and the temperature and/or speed of the air flow and/or speed of the material may be adjusted to maintain the temperature of the material at a desired level to provide consistent, uniform heating of the material.

The pre-heated material is then drawn into the heated mould 208. In this example, the mould is an oil-heated mould similar to that described in Example 1. In one embodiment, the heated mould 208 maintains the temperature of the material at given temperature selected, for example, based on the material properties of the panel material as it passes through the heated mould. For instance, in a particular embodiment, the heated mould 208 may maintain the temperature of the material at a temperature of greater than or equal to approximately 140° C. and/or less than or equal to approximately 180° C., including any temperatures defined therebetween in increments of 5° C. Optionally, a further pre-heating mould may be provided before the heated mould 208 if the pre-heating unit 207 does not provide sufficient heat.

Figure 14:
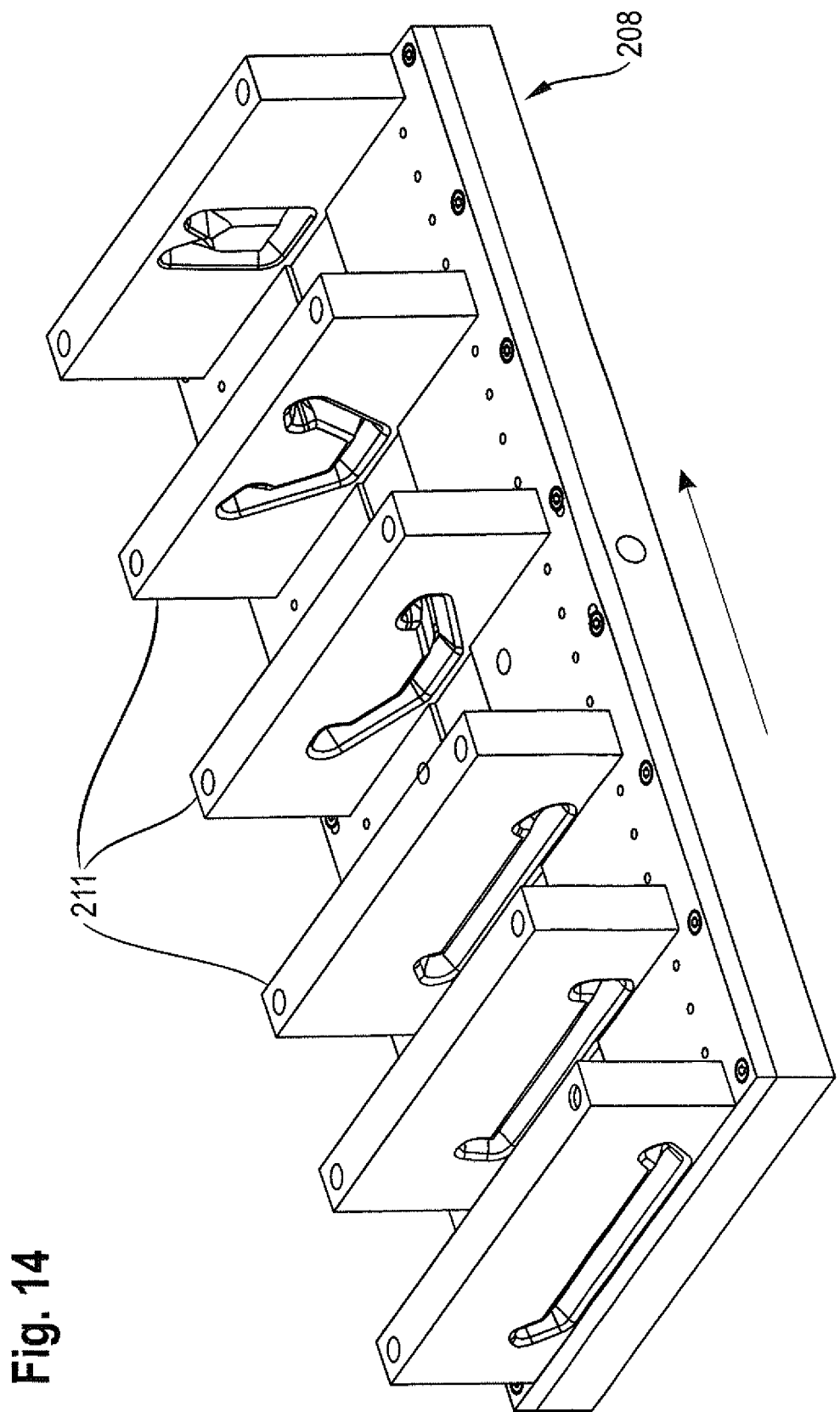
FIG. 14 illustrates an isometric view of one embodiment of a plurality of form blocks included within a heated mould in accordance with aspects of the present subject matter.

The heated mould 208 in this example comprises a plurality of form blocks 211 as shown in FIG. 14. The form blocks 211 are able to be fitted into and removed from the heated mould 208, and act to gradually deform the heated material as it passes through each form block. Material entering the heated mould 208 passes through each of the form blocks in turn in the direction of the arrow, each form block further deforming the material so that it leaves the heated mould in the form of a linear panel having the shape of the final form block. If desired, the form blocks may be provided with guided surfaces to further assist the guidance of the material through the form blocks.

Figure 15:
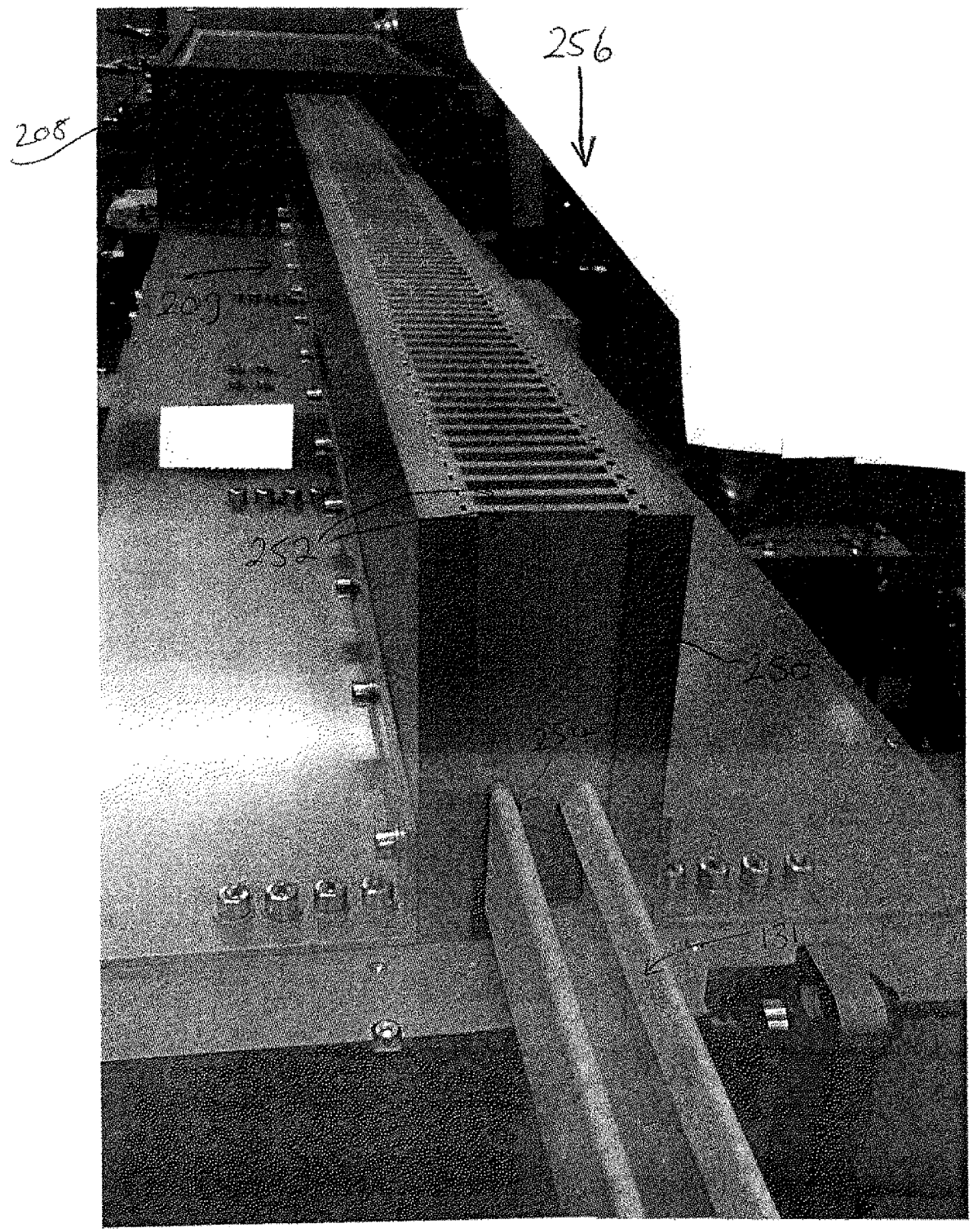
FIG. 15 illustrates a photographic view of one embodiment of a cooling unit that may be utilized in accordance with aspects of the present subject matter for cooling panel material.

In this example, a cooling unit 209 is provided downstream of the heated mould 208. The cooling unit of this example comprises an air pump and a heat exchanger for cooling the air. In other embodiments, the cooling unit may not require a heat exchanger if air at ambient temperature is to be used rather than cooled air. The cooled or ambient air is sucked through the material as it passes through the cooling unit. In other examples, the cooled or ambient air may be blown onto the material as it passes through the cooling unit. One or more cooling units may be provided such that the material exiting the cooling unit is lowered to a given temperature, such as a temperature of less than or equal to approximately 80° C. and/or greater than or equal to 35° C., for example. This permits the fibers to be fixed into position and sets and stabilizes the final shape of the panel, ready for cutting to length. In one embodiment, the cooling unit may include one or more form blocks having cut-outs in the shape of the finished panel and being spaced apart from each other, thereby allowing the cooling air to make contact with and/or pass through the material between the form blocks. An example of such a cooling unit is shown in FIG. 15. As can be seen in FIG. 15, the cooling unit includes a form block holder 250 holding a plurality of form blocks 252. Each of the form blocks 252 has the same cut out shape 254 for accommodating and maintaining the formed panel shape of the elongate material as it passes through the cooling unit. The air flow 256 is able to contact and/or pass through the material where it is exposed between the form blocks as it is continuously drawn through the cooling unit, thereby cooling the material. In one embodiment, the temperature of the material may be monitored as it passes through the cooling unit and the temperature and/or speed of the cooling air flow and/or the speed of the material may be adjusted to enable the temperature of the material to reach a desired level upon exit from the cooling unit. As indicated above, by the time the material exits the cooling unit, it is preferably at a given exit temperature, such as a temperature of less than or equal to approximately 80° C. and/or greater than or equal to 35° C., for example. In FIG. 15, there are approximately 100 form blocks each of approximately 6 mm thickness and with a spacing of approximately 10 mm between adjacent form blocks. However, the number of form blocks, the thickness of the form blocks and the spacing between the form blocks may be arranged as desired.

Once the panel has cooled, it is more able to be pulled without unwanted stretching of the material and a pulling unit 189 may be provided for this purpose. The pulling unit 189 of this example is in the form of one or more rollers that may include spikes, a rough surface such as sandpaper, or other elements configured for engagement with the material. The pulling unit pulls the cooled material through apparatus including the pre-heating unit, the forming mould and the cooling unit. In one embodiment, the pulling unit 189 may include two rollers, one located adjacent the other with the elongate material passing between the rollers, as shown in FIG. 13.

Figure 16:
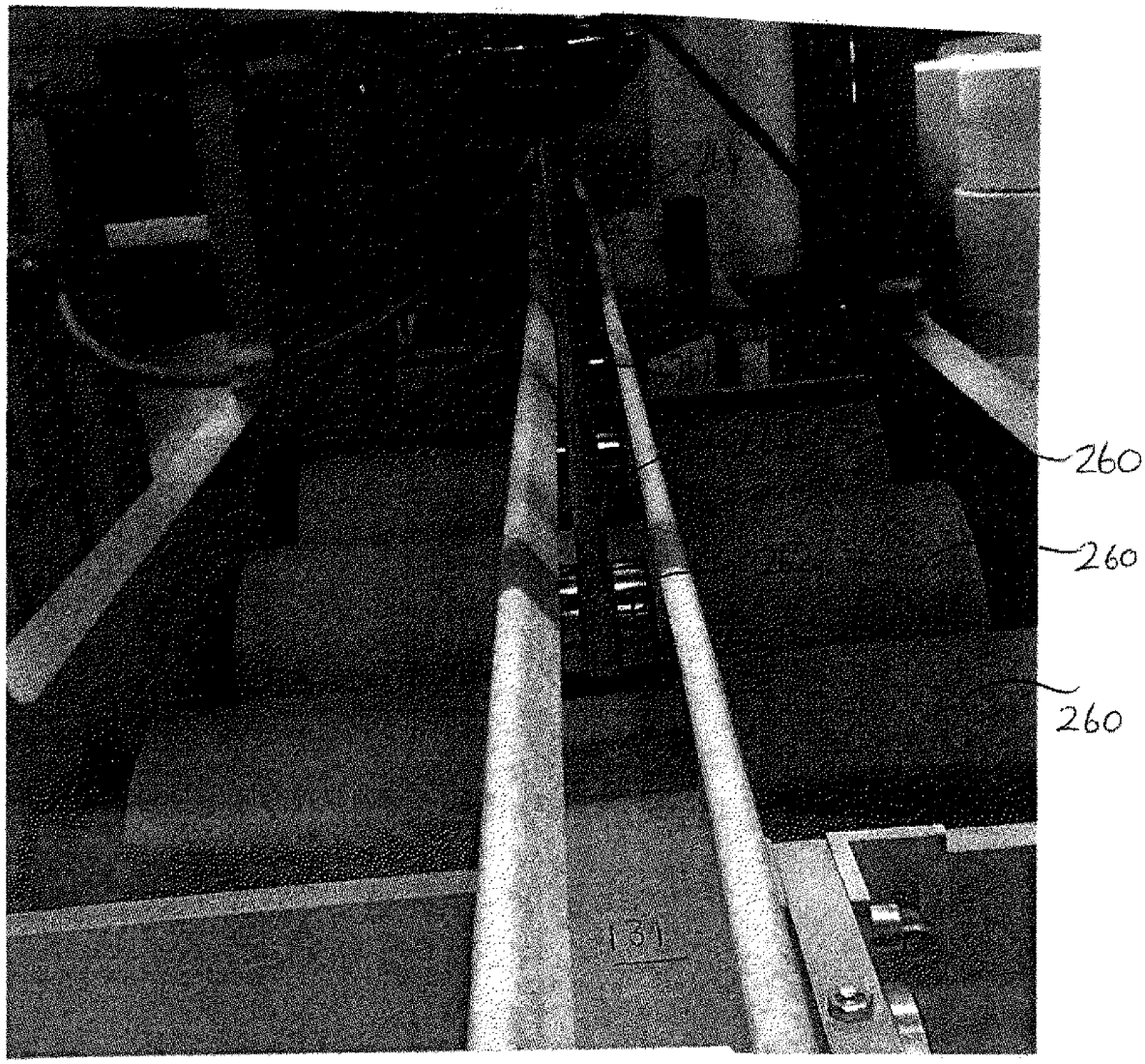
FIG. 16 illustrates a photographic view of one embodiment of a pulling unit that may be utilized in accordance with aspects of the present subject matter for pulling panel material.

Alternatively, the pulling unit may be as shown in FIG. 16. In FIG. 16, the pulling unit includes three rollers 260, each roller being arranged one after the other along the direction of travel of the material and each roller having a surface incorporating spikes or a rough surface such as sandpaper, and a further roller, wheel or ball bearing 262 located adjacent each roller 260. Although this example shows three rollers, there may be more or fewer rollers 260, each having an adjacent roller, wheel or ball bearing 262. The elongate material is pulled through between the roller 260 and the adjacent roller, wheel or ball bearing 262 by the rotation of the roller 260. The roller, wheel or ball bearing may have a smooth surface, in contrast to roller 260, and is supported by rod 264. The roller, wheel or ball bearing 262 may be biased towards the roller 260. The roller, wheel or ball bearing 262 acts to keep the elongate material in contact with the roller 260 so that the rotation of the roller 260 acts to move the elongate material along in a linear direction approximately tangential to the surface of the roller 260, thereby pulling the elongate material through the pre-heating, moulding and cooling apparatus.

In this example, a distance counting unit 213 is provided, however, this is optional. The distance counting unit ensures that the panels are cut at an equal, desired length. An optional weld recognition unit 215 may also be provided to identify the regions where two coils of material have been joined together, so that these regions may be removed and do not form part of a finished panel. Such a distance counting unit and/or optical weld recognition unit could also be provided in the apparatus and method taught in Examples 1 and 2 if desired.

Finally, the cooled elongate panel may be cut into two or more panels of desired lengths by cutting unit 191, and a packing table 193 may be provided at the downstream end of the production apparatus.

It should be appreciated that, similar to Example 2 described above, the various processing components described with reference to Example 3 may be automatically controlled, for example, via a suitable controller or central control unit, such as the central control unit 179 shown in FIG. 10.

In other examples of the present subject matter, colour may be added to the panels during forming of the panels. For example, as described above, logos, patterns, designs, and/or indicia may be applied to the material during forming of the panels. For example, a branding unit 205 may be provided in the form of an ink jet printer, or printing may be carried out using transfer printing during the manufacture of the panel.

Additionally, in one embodiment, be fibres used to form the material may be of a pale colour, a dark colour, or of a combination of colours. Where the material is a dark colour, it will be more prone to absorb heat and therefore the air used for pre-heating may be at a lower temperature and/or the air flow in the pre-heating unit may be at a lower speed than for a lighter-coloured material.

Additionally, in one embodiment, the air temperature and/or air flow speed in the pre-heating unit is controlled to ensure that the temperature of the material passing through the pre-heating unit is at a desired level, particularly upon exit.

Moreover, in one embodiment, it should be appreciated that a combination of roll-forming techniques and heated moulds may be used in the manufacture of the linear panels.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other, identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

The invention claimed is:

1. A method of forming a linear panel from a thermoformable fibrous material by a continuous process, the method comprising:
   continuously drawing an elongate strip of thermoformable fibrous material in a processing direction through a heating station, said material comprising a plurality of fibers, a first portion of the plurality of fibers having a first melting temperature and a second portion of the plurality of fibers having a second melting temperature that is less than the first melting temperature;
   heating said material within said heat station to a temperature of greater than or equal to the second melting temperature and less than the first melting temperature such that the second portion of the plurality of fibers melt without melting the first portion of the plurality of fibers;
   forming said heated material into a desired panel shape as said heated material passes through a heated mould of said heating station, said heated mould including a plurality of form blocks spaced apart from one another in the processing direction, with each form block comprising a heated plate defining a different cut-out shape such that, when said material passes through said heated mould, said material passes through each of said plurality of form blocks to progressively change a shape of said material; and
   continuously drawing said material through a cooling unit in order to cool said material after said material has been formed into the desired panel shape.

2. The method of claim 1, wherein the second melting temperature is greater than or equal to approximately 80° C. and less than or equal to approximately 250° C.

3. The method of claim 1, wherein the desired panel shape includes a flange extending along at least part of an elongate side of said elongate strip of material.

4. The method of claim 1, wherein said plurality of fibers comprises at least one of a plurality of bi-component polyester fibers, two different types of fibers, a mixture of bi-component polyester fibers, or a plurality of non-bi-component polyester fibers.

5. The method of claim 1, wherein:
   said plurality of fibers comprises the plurality of bi-component polyester fibers; and
   each fiber of said plurality of fibers includes an inner core formed from a first polyester material and an outer layer formed from a second polyester material.

6. The method of claim 5, wherein:
   said first portion of said plurality of fibers comprises said inner cores of said plurality of fibers formed from said first polyester material; and
   said second portion of said plurality of fibers comprises said outer layers of said plurality of fibers formed from said second polyester material.

7. The method of claim 1, further comprising pre-heating said material by passing a heated air flow through said material as said material is continuously drawn through said heated air flow.

8. The method of claim 7, further comprising adjusting at least one of a temperature of a heated air flow used to heat said material, a speed of the heated air flow, or a processing speed of said material to maintain the temperature of said material at a given temperature or to adjust the temperature of said material to a given temperature.

9. The method of claim 1, further comprising monitoring the temperature of said material as said material is heated.

10. The method of claim 1, wherein:
    cooling said material comprises passing an air flow through said material as said material is continuously drawn through the air flow; and
    the air flow is at a temperature at or below ambient air temperature.

11. The method of claim 10, further comprising:
    monitoring a cooled temperature of said material as said material passes through said cooling unit; and
    adjusting at least one of a temperature of the air flow, a speed of the air flow, or a processing speed of said material to adjust the cooled temperature of said material to a given temperature.

12. The method of claim 1, further comprising cutting said elongate strip of material into linear panel lengths after said material has been formed and cooled.

13. The method of claim 1, further comprising pulling said material through said heating station via a pulling unit including at least one roller having a surface formed of at least one of a resilient material, a sticky material, or a rough material or spikes.

14. The method of claim 1, wherein said panel is formed by a continuous roll-forming process.

15. The method of claim 1, further comprising controlling the processing speed of said material and a temperature of said heated mould as said elongate strip of material is drawn through said heated mould.

16. The method of claim 1, wherein:
said elongate strip includes a first side and a second side;
heating said material within said heat station comprises heating said material along said first side of said elongate strip to a temperature of greater than or equal to the second melting temperature and less than the first melting temperature such that the second portion of the plurality of fibers positioned along said first side of said elongate strip melt without melting the first portion of the plurality of fibers positioned along said first side of said elongate strip or the first and second portions of the plurality of fibers positioned along said second side of said elongate strip.

17. The method of claim 16, wherein:
forming said heated material into the desired panel shape comprises forming said heated material into a linear panel having an interior surface and an exterior surface; and
said interior surface is defined by said first side of said elongated strip and said exterior surface is defined by said second side of said elongated strip.

18. A method of forming a linear panel from a thermoformable fibrous material by a continuous process, the method comprising:
continuously drawing an elongate strip of thermoformable fibrous material through a heating station, said elongate strip including a first side and a second side, said material comprising a plurality of bi-component fibers, each fiber of said plurality of bi-component fibers including an inner core and an outer layer surrounding said inner core, a first portion of said plurality of bi-component fibers being positioned along said first side of said elongate strip and a second portion of said plurality of bi-component fibers being positioned along said second side of said elongate strip;
heating said elongate strip within said heat station to a temperature such that said outer layers of said first portion of said plurality of bi-component fibers melt without melting said inner cores of said first portion of said plurality of bi-component fibers or said outer layers of said second portion of said plurality of bi-component fibers;
forming said heated elongate strip into a desired panel shape having an interior surface and an exterior surface, said interior surface being defined by said first side of said elongated strip and said exterior surface being defined by said second side of said elongated strip; and
continuously drawing said elongate strip through a cooling unit in order to cool said material after said elongate strip has been formed into the desired panel shape.

19. The method of claim 18, wherein:
said inner core of each said fiber of said plurality of bi-component fibers is formed from a first material having a first melting temperature and said outer layer of each said fiber of said plurality of bi-component fibers is formed from a second material having a second melting temperature; and
said first melting temperature is greater than said second melting temperature.

20. The method of claim 19, wherein heating said elongate strip comprises heating said first side of said elongate strip within said heat station to a temperature of greater than or equal to the second melting temperature and less than the first melting temperature.

21. The method of claim 18, wherein:
continuously drawing said elongate strip through said heating station comprises continuously drawing said elongate strip in a processing direction through said heating station;
forming said heated elongate strip into the desired panel shape comprises forming said heated elongate strip into the desired panel shape as said elongate strip passes through a heated mould of said heating station;
said heated mould includes a plurality of form blocks spaced apart from one another in the processing direction; and
each form block comprises a heated plate defining a different cut-out shape such that, when said elongate strip passes through said heated mould, said elongate strip passes through each of said plurality of form blocks to progressively change a shape of said elongate strip.

* * * * *